US012715996B2

(12) United States Patent
Wang

(10) Patent No.: US 12,715,996 B2
(45) Date of Patent: Aug. 25, 2026

(54) COMPOSITION OF BIODEGRADABLE PLANT FIBER RAW MATERIAL GRAINS, AND PRODUCTION METHOD THEREOF

(71) Applicants: Cheng Hsiang Wang, Taichung City (TW); Amica Terra Co., Ltd., Tokyo (JP)

(72) Inventor: Cheng Hsiang Wang, Taichung City (TW)

(73) Assignees: Cheng Hsiang Wang, Taichung City (TW); Amica Terra Co., Ltd., Tokyo (JP)

( * ) Notice: Subject to any disclaimer, the term of this patent is extended or adjusted under 35 U.S.C. 154(b) by 953 days.

(21) Appl. No.: 17/912,639

(22) PCT Filed: Mar. 1, 2021

(86) PCT No.: PCT/JP2021/007719
§ 371 (c)(1),
(2) Date: Sep. 19, 2022

(87) PCT Pub. No.: WO2021/187072
PCT Pub. Date: Sep. 23, 2021

(65) Prior Publication Data

US 2023/0145833 A1 May 11, 2023

(30) Foreign Application Priority Data

Mar. 19, 2020 (JP) ................................ 2020-049203

(51) Int. Cl.
*B01J 2/20* (2006.01)
*B01J 2/28* (2006.01)
*C08L 97/02* (2006.01)

(52) U.S. Cl.
CPC ................ *C08L 97/02* (2013.01); *B01J 2/20* (2013.01); *B01J 2/28* (2013.01); *C08L 2201/06* (2013.01); *C08L 2205/035* (2013.01)

(58) Field of Classification Search
CPC ........................................................ B01J 2/28
See application file for complete search history.

(56) References Cited

U.S. PATENT DOCUMENTS

2005/0158541 A1* 7/2005 Tanaka ..................... C08L 3/02
264/165
2015/0048554 A1* 2/2015 Karrer .................. B29C 48/022
264/494

FOREIGN PATENT DOCUMENTS

CN 111560174 A 8/2020

OTHER PUBLICATIONS

Extended European Search Report dated Mar. 14, 2024, issued in corresponding European Patent Application No. 21771058.1.

* cited by examiner

*Primary Examiner* — Virak Nguon
(74) *Attorney, Agent, or Firm* — Morgan, Lewis & Bockius LLP

(57) ABSTRACT

Raw material grains according to the present invention comprise, as components, 40 to 60% plant fiber powder, 20 to 30% starch, 10 to 20% vegetable gum powder obtained by fermenting starch, 2 to 15% water-soluble polymer glue, and 1 to 10% water-soluble cellulose derivative. The production process thereof primarily includes: a step of appropriately adjusting blending ratios in accordance with the production method, rotating and kneading for 10-40 minutes the fiber powder, starch, and vegetable gum powder, each in a separate kneader, and then batch stirring and kneading all of the blending components in a fourth kneader to thereby obtain a raw material; and a step of subsequently molding the (Continued)

mixed raw material into a plurality of strands in a molding device, cutting the strands into granular raw material grains via a cutting unit, cooling the raw material grains, and then packaging a raw material grain product.

11 Claims, 3 Drawing Sheets

COMPOSITION OF BIODEGRADABLE PLANT FIBER RAW MATERIAL GRAINS, AND PRODUCTION METHOD THEREOF

TECHNICAL FIELD

The present invention relates to composition components of raw material grains for use in a processing molding machine, and a production method thereof. Particularly, the present invention relates to a production method for producing raw material grains by using a natural plant fiber, starch, and the like as raw materials.

BACKGROUND ART

Along with the development of scientific technologies, plastic products are further increasing in the modern daily life. Plastics can be produced at low costs, have a variety of characteristics, and are easy to use, thus contributing to the convenience of living. However, if a plastic product is not naturally decomposed and is carelessly thrown away, the plastic product flows into the sea, and is eventually carried by the ocean flows to across the world. As a result, various living organisms in the sea erroneously take in plastics into death or are entangled with plastic products and are thus hindered from moving, or become unable to feed. Such plastics not only bring about damage against the oceanic ecosystem, but also are accumulated in the food chain to consequently harm humans as well. Such marine debris does not only harm the health and the natural ecosystem, but also affect the governments, the life of local people, and leads to economical loss. Particularly, damages on fishing, tourism, and shipping are largest. In addition, most plastics, when heated, generate toxins to harm the human bodies. The best solution is to stop the use of plastic products and to use alternative materials that can be naturally decomposed. Currently, as alternative materials, paper products, products produced using natural materials such as wood and fiber, for example, bowls, cups, straws, bottles, and the like, produced using plant fibers are known. The above fiber material products are produced by using different processing machines for, for example, injection molding, extrusion molding, blow molding, and the like depending on the products. Depending on the technique for processing and molding products, there is a case where the prescription and the production process of raw material grains need to be changed, which is very undesirable for spread of the environmental protection industry, which has been just started. For this reason, how to produce raw material grains for use in different processing machines by using the same raw material prescription and production process has been the development target in the industry.

In view of this, the present inventor and others have earnestly conducted studies on the above problem, and actively sought a solution based on the long-term experiences of development and production in the industry. As a result of the long-term research and development, the present inventor and others have successfully developed a "composition of biodegradable plant fiber raw material grains, and a production method thereof" of the present invention for reducing the conventional problems.

SUMMARY OF INVENTION

A major object of the present invention is to provide a "composition of biodegradable plant fiber raw material grains, and a production method thereof". The present invention makes it possible to produce raw material grains for use in processing machines for injection molding, extrusion molding, blow molding, and the like through the same production process using the same raw material prescription only by adjusting the blending ratio in production of plant fiber raw material grains. Therefore, the productivity and practicality of environment protection products can be improved.

In order to achieve the above object, in the "composition of biodegradable plant fiber raw material grains, and a production method thereof" of the present invention, a blending ratios of raw material grains are 40 to 60% for plant fiber powder, 20 to 30% for starch, 10 to 20% for vegetable gum powder obtained by fermenting starch, 2 to 15% for water-soluble polymer glue, and 1 to 10% for water-soluble cellulose derivative.

In addition, the production process includes the following steps.

A. <Acquisition of Raw Materials>

Raw materials such as the above plant fiber powder, starch, vegetable gum powder obtained by fermenting starch, water-soluble polymer glue, and water-soluble cellulose derivative are acquired. The ratio of each raw material is adjusted as appropriate depending on the processed product of raw material grains, and the processing and molding method. That is, although the prescription for the raw material grains is the same, the ratios are different depending on the processing such as injection molding, extrusion molding, or blow molding. Note that the differences in ratios are adjusted to be within the above ranges for the raw material ratios.

B. <Kneading of Fiber Powder>

The fiber powder is put into a first kneader, and is rotated and kneaded at a high speed under conditions of 10 to 30 minutes, 40 to 60° C., and 600 to 1200 RPM to soften the fiber powder.

C. <Kneading of Starch>

The starch and the water-soluble cellulose derivative are put into a second kneader, and are rotated and kneaded at a high speed under conditions of 10 to 20 minutes and 600 to 1200 RPM to activate the fluidity of the powder granules.

D. <Kneading of Vegetable Gum Powder>

The vegetable gum powder is put into a third kneader, and is rotated and kneaded under conditions of 10 to 40 minutes and a rotation speed of 100 RPM or less to be made viscous.

E. <Overall Kneading>

The fiber powder, starch, and vegetable gum powder kneaded, and the water-soluble polymer glue are put into a fourth kneader, and are agitated for 10 to 40 minutes while the temperature is set to 40 to 80° C. to uniformly knead a mixed raw material.

F. <Molding of Strands>

The molding device includes a raw material inlet provided at one end, a raw material outlet provided at the other end, and a transport unit provided between the raw material inlet and the raw material outlet. The mixed raw material is loaded into the molding device, is rotated and agitated while being transported from an end of the raw material inlet to an end of the raw material outlet by using the transport unit and also heated, and is extrusion-molded into a plurality of string-shaped strands through the raw material outlet.

G. <Cutting Granulation>

The strands are first cooled by using a first cooling system, and then the strands are cut into granular raw material grains by using a cutting unit.

H. <Cooling of Raw Material Grains>

The raw material grains thus cut are cooled by using a second cooling system, and transported to a storage tub, and are thereafter packaged into products.

Therefore, it is possible to produce plant fiber raw material grains for use in different processing machines through the same production process only by adjusting the blending ratio in the above prescription and production process.

Hereinafter, the technique, the means, and the advantageous effect of the present invention will be described by giving a preferable embodiment with reference to the drawings so that the above object, configuration, and characteristic of the present invention can be more deeply and specifically understood.

DESCRIPTION OF EMBODIMENTS

Figure 1:
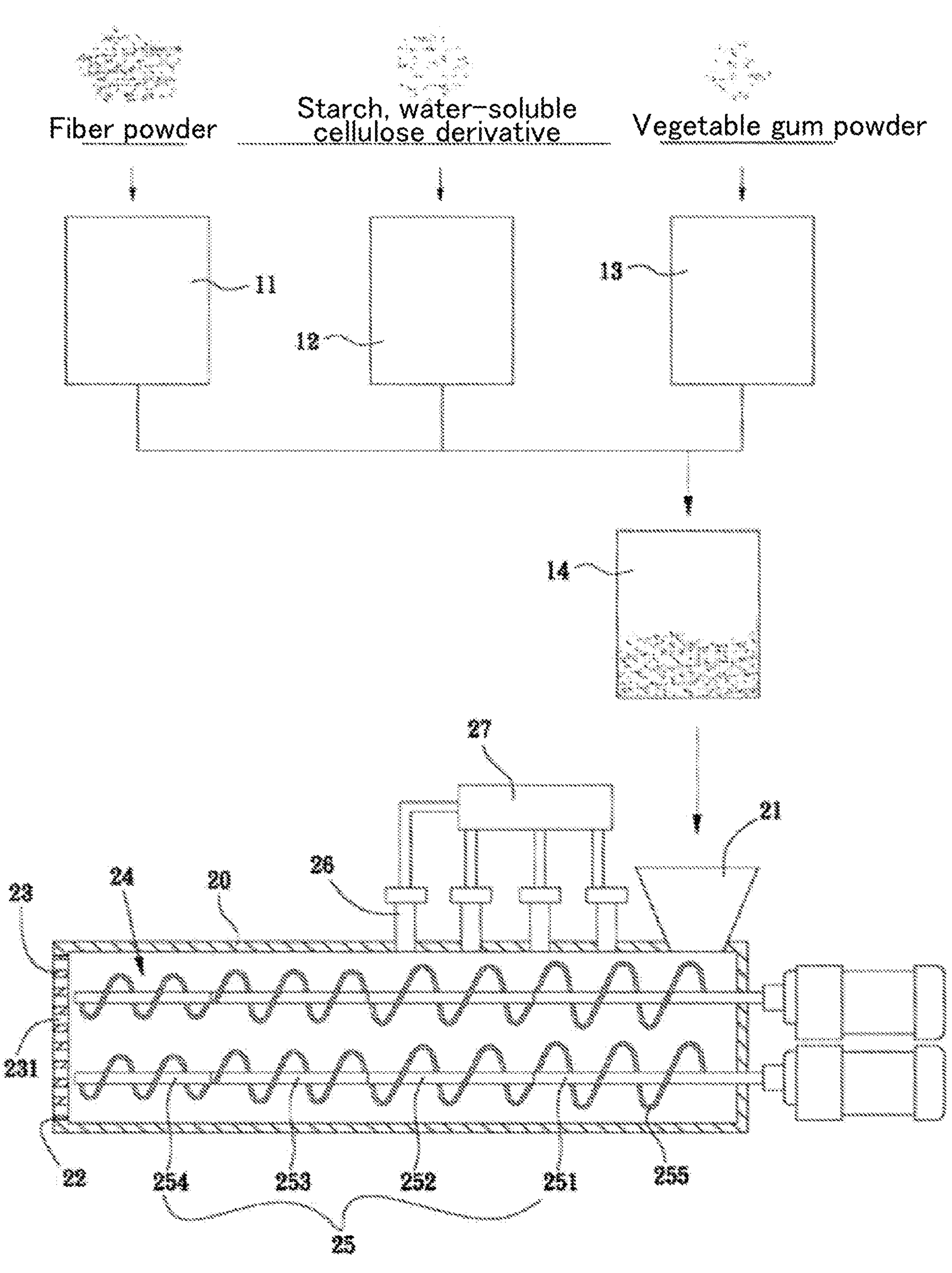
FIG. 1 is a schematic diagram illustrating processing to obtain strands by kneading in accordance with the raw material prescription of the present invention.
Figure 2:
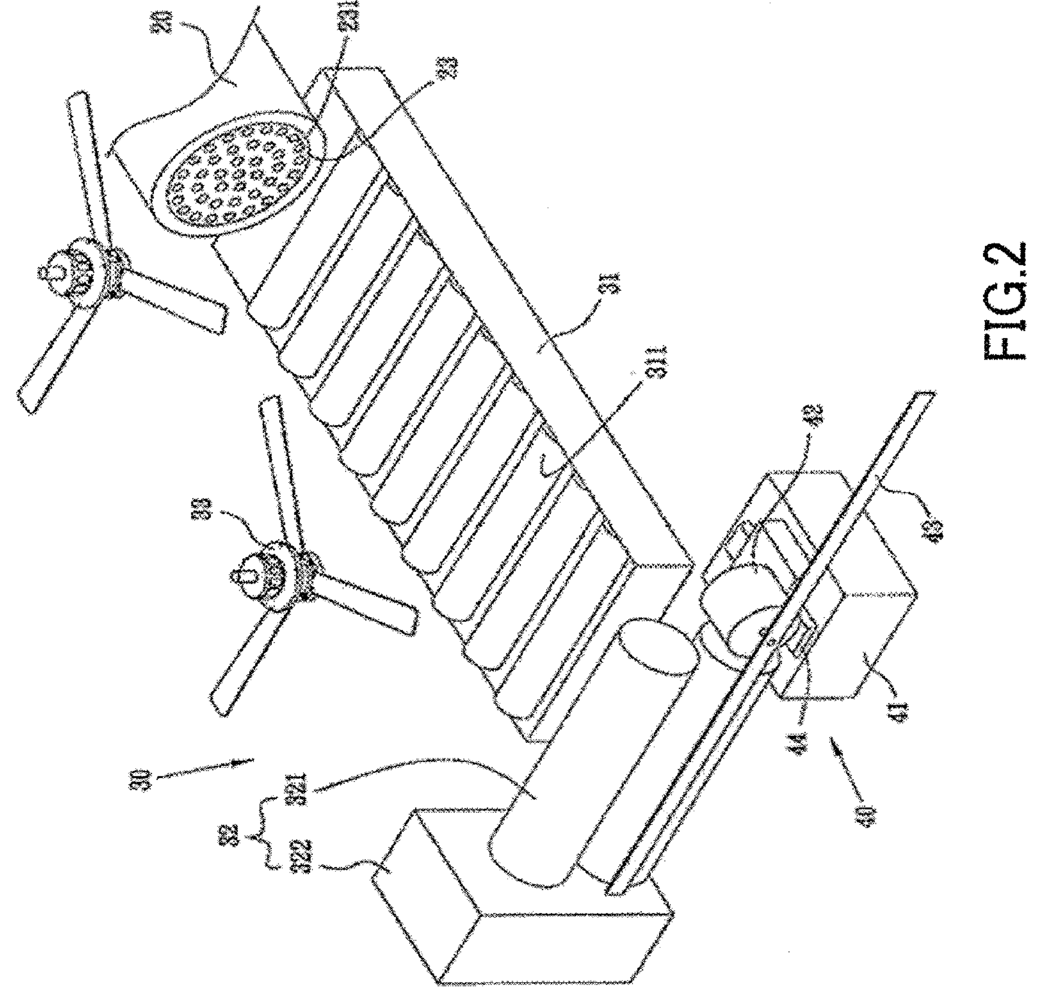
FIG. 2 is a schematic diagram illustrating a first cooling system and a cutting unit of the present invention.
Figure 3:
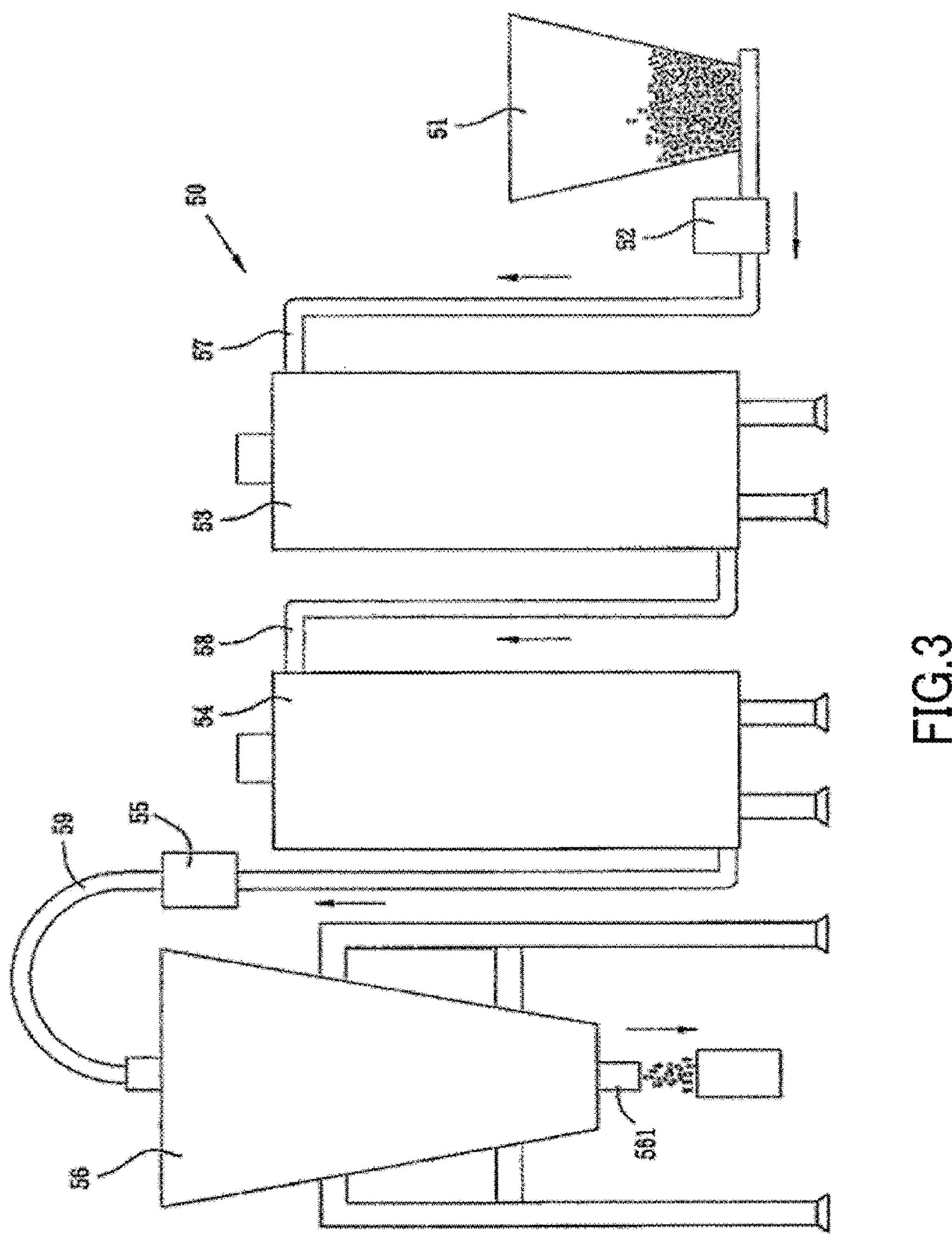
FIG. 3 is a schematic diagram illustrating a configuration structure of a second cooling system of the present invention and use thereof.

As shown in FIGS. 1 to 3, in a "composition of biodegradable plant fiber raw material grains, and a production method thereof" of the present invention, the blending ratios of the fiber raw material grains are 40 to 60% for plant fiber powder, 20 to 30% for starch, 10 to 20% for vegetable gum powder obtained by fermenting starch, 2 to 15%, and preferably 5 to 10% for water-soluble polymer glue, and 1 to 10%, and preferably 3 to 5% for water-soluble cellulose derivative. The production equipment includes a plurality of kneaders 11, 12, 13, and 14, a molding device 20, a first cooling system 30, a cutting unit 40, and a second cooling system 50. The production process includes the following steps.

A. <Acquisition of Raw Materials>

Prescription raw materials for fiber raw material grains are each acquired. The prescription raw materials contain 40 to 60% plant fiber powder, 20 to 30% starch, 10 to 20% vegetable gum powder obtained by fermenting starch, 2 to 15%, and preferably 5 to 10% water-soluble polymer glue, and 1 to 10%, and preferably 3 to 5% water-soluble cellulose derivative, and the like. Among these, the plant fiber powder is obtained by using stem, bark, leaves, pericarp, or the like of a natural plant as a fiber raw material, pulverizing and drying the fiber raw material, and then processing the fiber raw material into a powder having a water content of 20% or less. The grain size of the powder is around 100 to 200 mesh. The starch may be one derived from a plant such as wheat, potato, corn, sweet potato, cassava, lotus root, rice, or algae. The vegetable gum powder is vegetable gum powder obtained by adding a fermenting strain to starch to ferment the starch. The water-soluble polymer glue is general polymer glue for adjusting the viscosity of vegetable gum. The water-soluble cellulose derivative is used to increase the viscosity and is preferably at least one selected from the group consisting of hydroxymethyl cellulose, hydroxyethyl cellulose, hydroxypropyl cellulose, carboxymethyl cellulose, carboxymethyl ethyl cellulose, ethyl hydroxyethyl cellulose, cellulose acetate, methyl cellulose, ethyl cellulose, and cellulose gum. The ratio of each of the above respective raw materials is adjusted as appropriate depending on a planned fabricated processed product of the raw material grains, and the processing and molding method. That is, although the prescription of raw material grains is the same, the ratios are different depending on the processing such as injection molding, extrusion molding, press molding, round bar molding, heat extrusion molding, or blow molding. Note that the difference in ratio is adjusted to be within the above ranges for the raw material ratios.

B. <Kneading of Fiber Powder>

The fiber powder is put into a first kneader 11, and is rotated and kneaded at a high speed under conditions of 10 to 30 minutes, 40 to 60° C., and 600 to 1200 RPM to soften the fiber powder. In addition, 2 to 5% bamboo vinegar solution may be added to decompose pesticides remaining in the plant fiber as necessary.

C. <Kneading of Starch>

The starch and the water-soluble cellulose derivative are put into a second kneader 12, and are rotated and kneaded at a high speed under conditions of 10 to 20 minutes and 600 to 1200 RPM to activate fluidity of powder granules.

D. <Kneading of Vegetable Gum Powder>

The vegetable gum powder is put into a third kneader 13, and is rotated and kneaded under conditions of 10 to 40 minutes and a rotation speed of 100 RPM or less to be made viscous.

E. <Overall Kneading>

The fiber powder, the starch, and the vegetable gum powder kneaded in the respective steps B, C, and D, and the water-soluble polymer glue are put into a fourth kneader 14, and are agitated for 10 to 40 minutes while the temperature is set to 40 to 80° C. to uniformly knead the mixed raw material.

F. <Molding of Strands>

The molding device 20 includes a raw material inlet 21 provided at one end through which the mixed raw material is loaded, and a raw material outlet 22 provided at the other end. The raw material inlet 21 is used to load the mixed raw material. The raw material outlet 22 is provided with a molding extrusion platen 23, and a plurality of opening holes 231 are formed in the extrusion platen 23. A transport unit 24 is provided between the raw material inlet 21 and the raw material outlet 22. The mixed raw material is loaded into the molding device 20, is rotated and agitated while being transported from an end of the raw material inlet 21 to an end of the raw material outlet 22 by using the transport unit 24 and also heated, and is extrusion-molded into a plurality of string-shaped strands through the extrusion platen 23 to the outside.

Moreover, the transport unit 24 includes two power screws 25, and each of the power screws 25 includes four transport rods 251, 252, 253, and 254 separated in multiple stages. A blade 255 is provided on the outer periphery of each transport rod 251, 252, 253, or 254. In addition, the size of the blade 255 of the first transport rod 251 which is located on the raw material inlet 21 side is larger than the blades 255 of the other transport rods 252, 253, and 254. The size of the blade 255 of the fourth transport rod 254 which is located on the raw material outlet 22 side is smaller than the blades 255 of the other transport rods 251, 252, and 253. In other words, the blades 255 on the outer peripheries of the transport rods 251, 252, 253, and 254 become gradually smaller from the end of the raw material inlet 21 toward the raw material outlet 22. Note that the temperature of each transport rod 251, 252, 253, or 254 is controlled to be 140 to 190° C. by a plurality of temperature adjusting devices (not shown). In addition, in the molding device 20, a plurality of exhaust pipes 26 are provided at positions corresponding to the first and second transport rods 251 and 252. The exhaust pipes 26 are connected to a vacuum machine 27, and water and water vapor are discharged to the outside through the exhaust pipes 26 when the mixed raw material is agitated and transported by the first and second transport rods 251 and 252. In this way, when the mixed raw material is transported by the transport unit 24, the mixed raw material is first uniformly agitated by the first and second transport rods 251 and 252, and then the mixed raw material is gradually extruded to the outside by the third and fourth transport rods 253 and 254 to be molded into string-shaped strands.

G. <Cutting Granulation>

The strands are first cooled by the first cooling system 30, and then the strands are cut into granular raw material grains by the cutting unit 40. The first cooling system 30 includes a transport stage 31, a power device 32 provided at an end of the transport stage 31, and a plurality of fans 33 provided above the transport stage 31. A plurality of rollers 311, on which the strands are to be placed and moved, are provided on the transport stage 31. Alternatively, the strands may be transported by a conveyor belt. Note that the power device 32 is a power source for moving the strands, and includes two rolls 321 on the opposite sides in the vertical direction. The two rolls 321 are separated at a certain interval, and can be rotated by a power source 322. During transportation, after the strands are extrusion-molded, the strands are placed on the transport stage 31, and the outer peripheries of the strands are sandwiched by the two rolls 321. As the strands are continually extrusion-molded, the power source 322 is simultaneously operated to move the strands on the transport stage 31. While the strands are moved, air is blown by the fans 33 to cool the strands.

Moreover, the cutting unit 40 is provided outside the adjacent two rolls 321. A motor 42 is provided on a cutter table 41, and a cutter blade 43 is rotated by the motor 42. The radius of the cutter blade 43 is larger than the width of the surface of the transport stage 31. The strands are moved through between the two rolls 321 and are cut into raw material grains by the rotating cutter blade 43. In addition, a slide rail 44 is provided between the bottom of the motor 42 and the cutter table 41. By moving the motor 42 on the slide rail 44, the cutting position of the cutter blade 43 can be adjusted.

H. <Cooling of Raw Material Grains>

The raw material grains thus cut are cooled by the second cooling system 50 while being transported. The second cooling system 50 includes a raw material collecting tub 51, a first blower 52, a first cooling tub 53, a second cooling tub 54, a second blower 55, and a storage tub 56. A first conduit 57 is provided between the raw material collecting tub 51 and the first cooling tub 53, a first second conduit 58 is provided between the first cooling tub 53 and the second cooling tub 54, and a third conduit 59 is provided between the second cooling tub 54 and the storage tub 56. In addition, the first blower 52 is provided at an appropriate position in the first conduit 57. The second blower 55 is provided at an appropriate position in the third conduit 59. After the raw material grains are cut and molded, the raw material grains drop or are put into the raw material collecting tub 51. Then, after the raw material grains are sent into the first cooling tub 53 by the first blower 52, the raw material grains inside the first cooling tub 53 are sent into the storage tub 56 by the second blower 55. A raw material drop opening 561 is provided in the bottom portion of the storage tub 56, so that the packaging work can be conducted by placing a packaging bag below the raw material drop opening 561. Hence, the present invention makes it possible to improve the efficiency in producing and manufacturing plant material grains by producing plant fiber raw material grains for use in different processing machines through the same production process only by adjusting the blending ratio in the above prescription and production process, and is useful in promoting the development of the industry.

In summary of the above, the present invention involves an excellent inventive step and practicality as compared with products of the same type. In addition, as a result of investigating domestic and overseas technical data and documents on similar configurations, it has not been found that the same structure existed previously. Hence, the present invention has novelty. Therefore, a patent application is going to be filed in compliance with the law.

The above embodiment is only an example for explaining the present invention. It goes without saying that modifications, improvements, and applications made by a person skilled in the art based on the embodiment without departing from the spirit of the present invention are encompassed within the scope of claims of the present invention.

REFERENCE SIGNS LIST

11 first kneader
12 second kneader
13 inside of third kneader
14 inside of fourth kneader
20 molding device
21 raw material inlet
22 raw material outlet
23 extrusion platen
231 opening hole
24 transport unit
25 power screw
251 first transport rod
252 second transport rod
253 third transport rod
254 fourth transport rod
255 blade
26 exhaust pipe
27 vacuum machine
30 first cooling system
31 transport stage
311 roller
32 power device
321 roll
322 power source
33 fan
40 cutting unit
41 cutter table
42 motor
43 cutter blade
44 slide rail
50 second cooling system
51 raw material collecting tub
52 first blower
53 first cooling tub
54 second cooling tub
55 second blower
56 storage tub
561 raw material drop opening
57 first conduit
58 second conduit
59 third conduit

What is claimed is:

1. A method for producing biodegradable plant fiber raw material grains, comprising the following steps A to H:

A. a raw materials acquiring step of acquiring raw materials of a composition comprising: 40 to 60% plant fiber powder; 20 to 30% starch; 10 to 20% vegetable gum powder obtained by fermenting starch; 2 to 15% water-soluble polymer glue; and 1 to 10% water-soluble cellulose derivative, and adjusting a ratio of each raw material depending on a planned processed product of the raw material grains and a processing and molding method;

B. a fiber powder kneading step of putting the plant fiber powder into a first kneader, and rotating and kneading the plant fiber powder at a high speed under conditions of 10 to 30 minutes, 40 to 60° C., and 600 to 1200 RPM to soften the plant fiber powder;

C. a starch kneading step of putting the starch and the water-soluble cellulose derivative into a second kneader, and rotating and kneading the starch and the water-soluble cellulose derivative at a high speed under conditions of 10 to 20 minutes and 600 to 1200 RPM to activate fluidity of the starch and the water-soluble cellulose derivative;

D. a vegetable gum powder kneading step of putting the vegetable gum powder into a third kneader, and rotating and kneading the vegetable gum powder under conditions of 10 to 40 minutes and a rotation speed of 100 RPM or less to make the vegetable gum powder viscous;

E. an overall kneading step of putting the plant fiber powder, the starch, and the vegetable gum powder kneaded, and the water-soluble polymer glue, into a fourth kneader, and agitating the plant fiber powder, the starch, the vegetable gum powder, and the water-soluble polymer glue for 10 to 40 minutes while setting a temperature to 40 to 80° C. to uniformly knead a mixed raw material;

F. a strand molding step of loading the mixed raw material into a molding device including a raw material inlet provided at one end, a raw material outlet provided at another end, and a transport unit provided between the raw material inlet and the raw material outlet, rotating and agitating the mixed raw material while transporting the mixed raw material from an end of the raw material inlet to an end of the raw material outlet by using the transport unit and also heating the mixed raw material, and extrusion-molding the mixed raw material into a plurality of string-shaped strands through the raw material outlet;

G. a cutting granulation step of first cooling the plurality of string-shaped strands by using a first cooling system, and then cutting the plurality of string-shaped strands into granular raw material grains by using a cutting unit; and H. a raw material grain cooling step of cooling the raw material grains cut, by using a second cooling system and transporting the raw material grains to a storage tub, and then packaging the raw material grains into a product.

2. The method for producing biodegradable plant fiber raw material grains according to claim 1, wherein the transport unit of the molding device includes two power screws, each of the power screws includes four transport rods separated in multiple stages, a blade is provided on an outer periphery of each transport rod, a size of the blade of a first one of the transport rods which is located on the raw material inlet side is larger than the blades of the other transport rods, a size of the blade of a fourth one of the transport rods which is located on the raw material outlet side is smaller than the blade of the other transport rods, when the mixed raw material is transported by the transport unit, the mixed raw material is first uniformly agitated by the first and second transport rods, and then the mixed raw material is successively extruded by the third and fourth transport rods, next, a temperature of each transport rod is controlled to be 140 to 190° C. by a temperature adjusting device, in the molding device, a plurality of exhaust pipes are provided at positions corresponding to the first and second transport rods, the exhaust pipes are connected to a vacuum machine, and water and water vapor are discharged to an outside through the exhaust pipes when the mixed raw material is agitated and transported by the first and second transport rods, and the raw material outlet is provided with a molding extrusion platen, a plurality of opening holes are formed in the extrusion platen, and the mixed raw material is extruded and molded into the plurality of string-shaped strands through the opening holes.

3. The method for producing biodegradable plant fiber raw material grains according to claim 1, wherein the first cooling system includes a transport stage, a power device provided at an end of the transport stage, and a plurality of fans provided above the transport stage, after the plurality of string-shaped strands are extrusion-molded, the plurality of string-shaped strands are placed on the transport stage, and outer peripheries of the plurality of string-shaped strands are set to the power device, when the plurality of string-shaped strands are continually extrusion-molded and the power device is simultaneously operated to move the plurality of string-shaped strands, air is blown by the fans to cool the plurality of string-shaped strands, the cutting unit is provided outside the adjacent power device, and after the plurality of string-shaped strands pass through the power device, the plurality of string-shaped strands are cut into raw material grains by the cutting unit.

4. The method for producing biodegradable plant fiber raw material grains according to claim 3, wherein the cutting unit includes a motor provided on a cutter table, and a cutter blade is rotated by the motor, a radius of the cutter blade is larger than a width of a surface of the transport stage, and after the plurality of string-shaped strands pass through the power device, the plurality of string-shaped strands are cut into raw material grains by the cutter blade.

5. The method for producing biodegradable plant fiber raw material grains according to claim 1, wherein the second cooling system includes a raw material collecting tub, a first blower, a first cooling tub, a second cooling tub, and a second blower, a first conduit is provided between the raw material collecting tub and the first cooling tub, a second conduit is provided between the first cooling tub and the second cooling tub, and a third conduit is provided between the second cooling tub and the storage tub, the first blower is provided at the first conduit, and the second blower is provided at the third conduit, and after the raw material grains are cut and molded, the raw material grains drop into the raw material collecting tub, first the raw material grains are sent into the first cooling tub by the first blower, and the raw material grains inside the first cooling tub are sent into the storage tub by the second blower.

6. The method for producing biodegradable plant fiber raw material grains according to claim 1, wherein a content of the water-soluble polymer glue in the composition is from 5 to 10%.

7. The method for producing biodegradable plant fiber raw material grains according to claim 1, wherein a content of the water-soluble cellulose derivative in the composition is from 3 to 5%.

8. The method for producing biodegradable plant fiber raw material grains according to claim 1, wherein the water-soluble cellulose derivative is at least one selected from the group consisting of hydroxymethyl cellulose, hydroxyethyl cellulose, hydroxypropyl cellulose, carboxymethyl cellulose, carboxymethyl ethyl cellulose, ethyl hydroxyethyl cellulose, cellulose acetate, methyl cellulose, ethyl cellulose, and cellulose gum.

9. The method for producing biodegradable plant fiber raw material grains according to claim 1, wherein the plant fiber powder is obtained by using stem, bark, leaves, or pericarp of a natural plant as a fiber raw material, pulverizing and drying the fiber raw material, and then processing the fiber raw material into a powder having a water content of 20% or less.

10. The method for producing biodegradable plant fiber raw material grains according to claim 1, wherein a grain size of the plant fiber powder is about 100 to 200 mesh.

11. The method for producing biodegradable plant fiber raw material grains according to claim 1, wherein the starch is derived from a plant selected from the group consisting of wheat, potato, corn, sweet potato, cassava, lotus root, rice, and algae.

* * * * *